(12) United States Patent
Vollmar et al.

(10) Patent No.: US 7,279,811 B2
(45) Date of Patent: Oct. 9, 2007

(54) ARRANGEMENT FOR SUPPLYING VARIABLE LOADS

(75) Inventors: Wilfried Vollmar, Soest (DE); Michael-Harro Liese, Soest (DE)

(73) Assignee: AEG SVS Power Supply Systems GmbH, Warstein (DE)

( * ) Notice: Subject to any disclaimer, the term of this patent is extended or adjusted under 35 U.S.C. 154(b) by 198 days.

(21) Appl. No.: 11/229,507

(22) Filed: Sep. 20, 2005

(65) Prior Publication Data
US 2006/0061295 A1 Mar. 23, 2006

(30) Foreign Application Priority Data
Sep. 21, 2004 (DE) .................. 20 2004 014 812 U

(51) Int. Cl.
*H02M 3/18* (2006.01)
(52) U.S. Cl. .................... 307/110; 307/35; 363/60; 363/131; 700/291
(58) Field of Classification Search ............ 307/31–40, 307/110, 111; 700/291, 293, 286, 299; 363/21.1, 363/21.2, 95, 60, 131; 702/62, 130
See application file for complete search history.

(56) References Cited

U.S. PATENT DOCUMENTS

| | | | | | |
|---|---|---|---|---|---|
| 4,819,180 | A | * | 4/1989 | Hedman et al. ............ 700/291 |
| 5,168,170 | A | * | 12/1992 | Hartig ........................ 307/35 |
| 5,568,035 | A | * | 10/1996 | Kato et al. .................. 320/166 |
| 6,052,300 | A | * | 4/2000 | Bishop et al. .............. 363/131 |
| 7,218,533 | B2 | * | 5/2007 | Radecker et al. ........ 363/21.02 |

\* cited by examiner

*Primary Examiner*—Rajnikant B. Patel
(74) *Attorney, Agent, or Firm*—Hoffman, Wasson & Gitler

(57) ABSTRACT

The invention relates to a first circuit arrangement (E) for supplying variable loads that can be connected to the first circuit arrangement (E) from a first current or voltage source (MV) in a first state of the first circuit arrangement having the following features: the first circuit arrangement (E) has a first terminal and a second terminal for connection to the first current or voltage source (MV) and a third terminal, at least one fourth terminal and at least one fifth terminal for connection to a second current or voltage source (Z); the second terminal is at a reference potential; the first circuit arrangement (E) has at least one eighth terminal for connection to two loads ($R_2$; $R_3$); the first circuit arrangement (E) has controllable switching means for changing over between the first state and a second state; in the first state, the at least one eighth terminal for connection to the two loads ($R_2$, $R_3$) is connected to the first terminal and the third terminal and the fifth terminal are connected to the reference potential, in the second state, the at least one eighth terminal is connected to the fourth terminal.

16 Claims, 1 Drawing Sheet

ARRANGEMENT FOR SUPPLYING VARIABLE LOADS

BACKGROUND OF THE INVENTION

The invention relates to a first circuit arrangement for supplying variable loads that can be connected to the first circuit arrangement, and an arrangement for supplying variable loads comprising the first circuit arrangement and a second circuit arrangement.

The document having the publication number DE 203 18 061 U1 discloses an arrangement for supplying an odd number of loads connected in parallel or in series with electrical energy. This arrangement can be operated in two different operating states. In a starting operating state, the loads connected to the arrangement are operated in a manner connected in parallel, while in a continuous operating state the loads are supplied with electrical energy in a manner connected in series. Such an arrangement can be used for example to operate thereby an electrochemical installation for deposition processes. During an electrochemical deposition process, the resistance values of the loads change as a result of the material (silicon) being deposited which settles on the loads. The resistance of the loads thus decreases, as a result of which, given a constant electrical power of the loads, the current rises and in counteraction the voltage decreases. If the current has risen to a specific extent, the arrangement is switched to the continuous operating state, so that the loads are operated in series. The series connection of the loads then results in a higher overall resistance at the terminals of the arrangement. As a result, smaller currents are possible for the same power.

Overall, the arrangement disclosed in the document has proved to be suitable. However, it has been shown that the loads must be at a specific temperature in order that the electrochemical deposition process can begin during the starting operating state. The loads have hitherto been preheated by radiant heaters or other auxiliary means in order to bring said loads to the required temperature for the starting operating state. Such preheating of the loads is undesirable owing to the risk of contamination.

SUMMARY OF THE INVENTION

The invention is based on the a first circuit arrangement and an arrangement including the first circuit arrangement by means of which, prior to the starting operating state of the arrangement known from the existing art, the loads that can be connected to the arrangement can be heated up.

The object is achieved by means of an arrangement having such a first circuit arrangement. According to the solutions of the invention, the previous starting operating state, which is designated hereinafter as the second starting operating state, is preceded by a first starting operating state.

An arrangement according to the invention has a first circuit arrangement and a second circuit arrangement, said second circuit arrangement serving as a second current or voltage source.

The arrangement can be operated in three states. Namely in the first starting operating state, in which the first circuit arrangement is in a first state and the loads can be supplied from a first current or voltage source. Furthermore, the arrangement can be operated in the second starting operating state, in which the first circuit arrangement is in a second state and the loads can be supplied from the second circuit arrangement in parallel with one another. The third state in which the arrangement can be operated is then the continuous operating state, in which the first circuit arrangement is likewise in the second state and the loads can be supplied from the second circuit arrangement in a manner connected in series. The second circuit arrangement is brought to a second state for this purpose. It is possible to effect changeover between the first starting operating state and the second starting operating state through switching means of the first circuit arrangement and between the second starting operating state and the continuous operating state through switching means of the second circuit arrangement.

The second circuit arrangement used may be, in principle, a circuit arrangement as known from the document already cited above.

A first circuit arrangement of this type is designed such that the loads or at least one portion of the loads can be connected to the first circuit arrangement. The loads can then be supplied from a first current or voltage source in a first state of the first circuit arrangement. The first circuit arrangement has a first terminal and a second terminal for connection to the first current or voltage source and a third terminal, at least one fourth terminal and at least one fifth terminal for connection to a second current or voltage source. In this case, the second terminal is at a reference potential. The first circuit arrangement furthermore has at least one terminal for connection to two loads, which is designated hereinafter as eighth terminal.

The first circuit arrangement furthermore has controllable switching means for changing over between the first state and a second state. In the first state, the eighth terminal for connection to the two loads is connected to the first terminal via one of the controllable switching means and the third terminal and the fifth terminal are connected to the reference potential via a respective one of the controllable switching means. In the second state, the eighth terminal is then connected to the fourth terminal via a further controllable switching means.

The first circuit arrangement according to the invention is configured such that no switching means are used in lines via which large currents flow in the second state. Rather, switching means are provided only in the lines in which no current or a comparatively small current flows in the second state of the first circuit arrangement, that is to say in the second starting operating state or in the continuous operating state of the arrangement.

A first circuit arrangement of this type may be designed such that all the loads can be connected to the first circuit arrangement, and that the loads can be supplied from a second current and voltage source, which may be, in particular, the second circuit arrangement, in a second state of the first circuit arrangement, via the first circuit arrangement. The first circuit arrangement has, in addition to the eighth terminal, a seventh terminal and at least one ninth terminal for connection to the loads.

The seventh terminal is directly connected to the third terminal in the first state and in the second state. That is to say that no switching means is provided in the connection between the seventh terminal and the third terminal. It is likewise possible for the ninth terminals to be connected to a fifth terminal in each case.

Finally, in the first state of the first circuit arrangement, the controllable switching means advantageously connect the seventh terminal and the ninth terminals, to which the loads are connected, to a reference potential and the eighth terminals, to which the loads can be connected, to the first terminal, to which the first current or voltage source can be connected.

The controllable switching means of a first circuit arrangement, in the second state of the first circuit arrangement, can connect the eighth terminals to a fourth terminal in each case.

The first circuit arrangement may advantageously have a sixth terminal and a tenth terminal. The sixth terminal and the tenth terminal can be connected to one another directly, that is to say as far as possible without the interposition of switching means or other components. The switching means of a first circuit arrangement according to the invention, in the first state of the first circuit arrangement, can connect the tenth terminal to a second reference potential, which may correspond to the first reference potential.

In the case of a first circuit arrangement according to the invention, it is possible that the loads can be connected between the seventh terminal and one of the eighth terminals, between one of the eighth terminals and one of the ninth terminals and between one of the ninth terminals and—if appropriate with the interposition of the tenth terminal—the second reference potential. In this case, it is then possible that all the loads can be connected in series between the seventh terminal and—if appropriate with the interposition of the tenth terminal—the second reference potential.

The switching means of a first circuit arrangement according to the invention can be driven by programmable control means or regulating means.

The second circuit arrangement of an arrangement according to the invention including the first circuit arrangement according to the invention and the second circuit arrangement may have means for ensuring a supply of the loads with electrical energy of identical magnitude in the second starting operating state of the arrangement.

In the continuous operating state, a first voltage may be dropped between a first output-side terminal of the second circuit arrangement, which is connected to the third terminal of the first circuit arrangement, and the second reference potential, while second output-side terminals of the second circuit arrangement are potential-free in no-load operation of the entire arrangement.

In the second starting operating state of the arrangement, in no-load operation—that is to say without any loads connected—, the first voltage may be dropped between the first output-side terminal and a first half of the second output-side terminals of the first circuit arrangement, on the one hand, and the second reference potential, while a second half of the second output-side terminals of the second circuit arrangement have the second reference potential.

The second circuit arrangement may comprise a last output-side terminal, which is at the second reference potential and which is advantageously connected to the sixth terminal of the first circuit arrangement.

The ensuring means of the second circuit arrangement may comprise coils.

BRIEF DESCRIPTION OF THE DRAWINGS

An arrangement according to the invention having a first circuit arrangement according to the invention and a second circuit arrangement as known from the document having the publication number DE 203 18 06 U1 is described in more detail with reference to the drawing, in which.

DETAILED DESCRIPTION OF THE INVENTION

Figure 1:
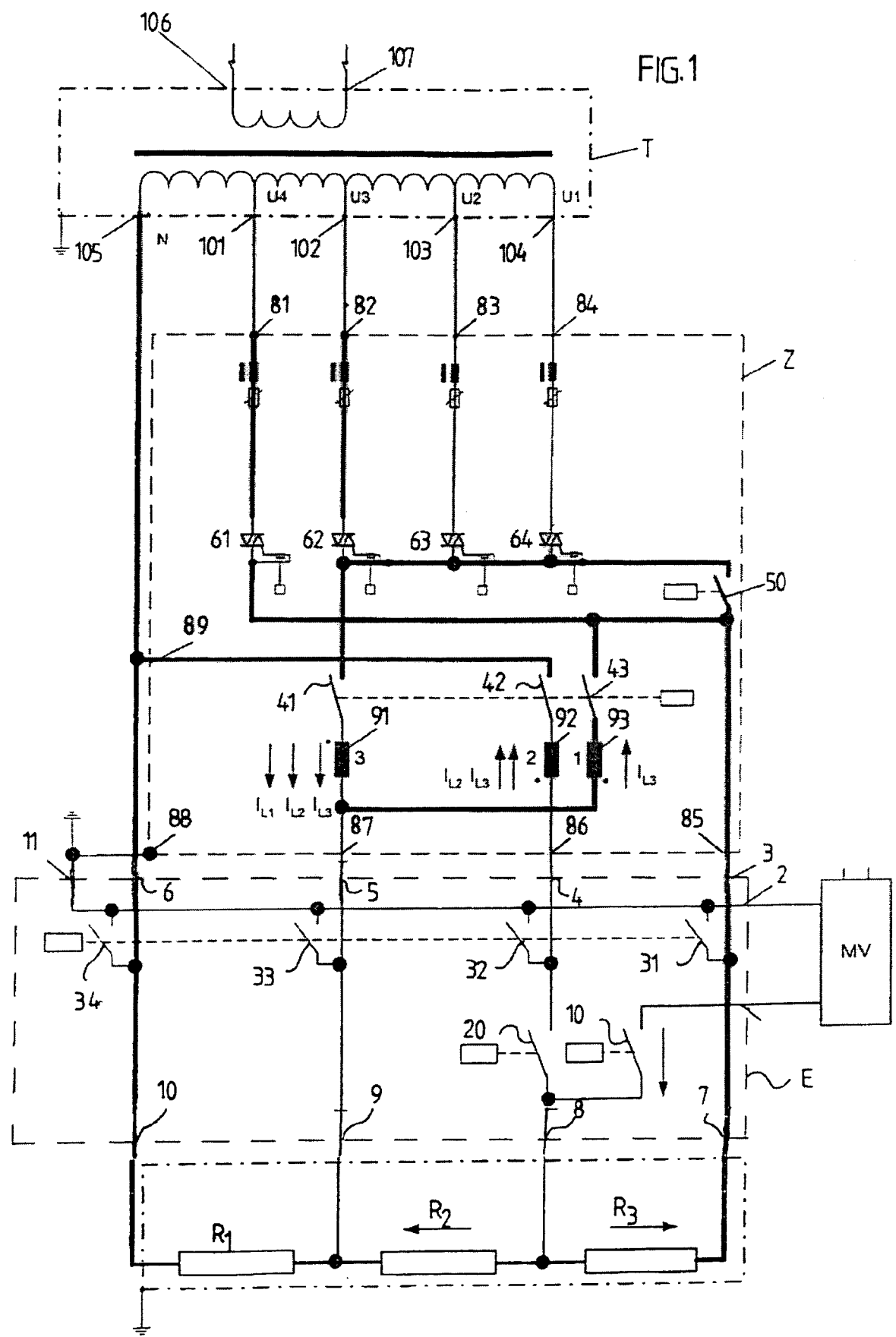
FIG. 1 shows the arrangement according to the invention with three connected loads and with a first connected voltage source.

The arrangement illustrated in FIG. 1 is provided for the supply of three loads $R_1$, $R_2$, $R_3$, in which case only the loads $R_1$, $R_2$ are supplied with a voltage in a first starting operating phase, all the loads $R_1$, $R_2$, $R_3$ are operated in parallel with one another in a second starting operating phase, and all the loads $R_1$, $R_2$, $R_3$ may be operated in a manner connected in series in a continuous operating state. The arrangement, comprising a first circuit arrangement E and a second circuit arrangement Z, is supplied with electrical energy by a first voltage source MV, which is a voltage source of 3 kV to 20 kV, but preferably of approximately 6 kV, and by a transformer T. In the first starting operating state, the arrangement according to the invention is in this case supplied with electrical energy by the medium voltage source, that is to say by the first voltage source MV; in the second starting operating state and in the continuous operating state, the arrangement according to the invention is supplied with electrical energy by the transformer T.

The transformer T has primary-side terminals 106, 107, via which the transformer T can be connected to a supply network. The secondary side of the transformer T has outer taps and center taps, the center taps being led to first output-side terminals 101, 102, 103 of the transformer T and also one of the outer taps being led to a first output-side terminal 104. The other outer tap is led to a second output-side terminal 105.

The second output-side terminal 105 of the transformer T is at a second reference potential. The first output-side terminals 101 to 104 of the transformer T are at a higher potential by comparison, so that a voltage is dropped between the first output-side terminals 101, 102, 103, 104, on the one hand, and the second output-side terminal 105, on the other hand. The voltage dropped between the first output-side terminal 101 and the second output-side terminal 105 may, however, carry 200 volts, for example, the voltage between the first output-side terminal 102 and the second output-side output terminal 105 may carry 300 volts, for example, the voltage between the first output-side terminal 103 and the second output-side terminal 105 may carry 550 volts, for example, and the voltage between the first output-side terminal 104 and the second output-side terminal 105 may carry 1000 volts, for example. The input voltage of the transformer T is arbitrary and is advantageously adapted to an existing medium voltage network.

The second circuit arrangement Z has first input-side terminals 81, 82, 83, 84. These first input-side terminals 81, 82, 83, 84 are connected to the first output-side terminals 101, 102, 103, 104 of the transformer T, so that the voltages dropped at said first output-side terminals of the transformer T with respect to the second output-side terminal 105 of the transformer T are present at the first input-side terminals 81, 82, 83, 84 of the second circuit arrangement.

Via a terminal 89, the second circuit arrangement Z is connected to the second output-side terminal 105 of the transformer T, so that the second reference potential can also be tapped off at the second circuit arrangement Z. From the first input-side terminals 81, 82, 83, 84, lines are led via current transformers and fusible links to the switching means 61 to 64, which are designated hereinafter as third controllable switching means. These third controllable switching means 61 to 64 may be triacs, as illustrated in FIG. 1. The second terminals of a first group 62, 63, 64 of the third controllable switching means 61 to 64 are connected to one another and are thus at the same potential. The second terminal of the remaining third controllable switching means 61 is connected via a second controllable switching means 50 to the second terminals of the first group 62, 63, 64 of the third controllable switching means 61 to 64. The second terminal of the remaining third controllable switching means 61 is also connected directly to a first output-side terminal 85 of the second circuit arrangement Z.

In addition to the first output-side terminal 85, the second circuit arrangement Z also has second output-side terminals 86, 87. A first half of these second output-side terminals 86, 87, namely the output-side terminal 87, is connected, on the one hand, via a coil 91 and a first controllable switching means 41 to the second terminals of the first group of the third controllable switching means 62, 63, 64 of the second circuit arrangement Z. On the other hand, the output-side terminal 87 is connected via a coil 93 and a first switching means 43 to the second terminal of the third switching means 61 and the first output-side terminal 85.

By contrast, the second half of the output-side terminals 86, 87, namely the output-side terminal 86, is connected via a coil 92 and a first switching means 42 to the terminal 89, that is to say to the second reference potential. The first switching means 41, 42, 43 are controllable switching means that are closed or opened simultaneously. The first switching means 41, 42, 43 of the second circuit arrangement Z are furthermore driven in such a way that they are open whenever the second switching means 50 is closed, and vice-versa.

The coils 91, 92, 93 are situated on a common core, so that they have an identical magnetomotive force. In this case, the coils 92, 93 illustrated on the right in the drawing have a winding sense opposite to the winding sense of the coil 91 illustrated on the left. The coils 91, 92, 93 form the means for ensuring a supply of the loads with electrical energy of identical magnitude in the second starting operating state of the arrangement. In this second starting operating state of the arrangement, the first switching means 41, 42, 43 of the second circuit arrangement Z are driven in such a way that they are closed, while the second switching means 50 of the second circuit arrangement Z is driven in such a way that it is open.

In the continuous operating state of the arrangement, in which the loads $R_1$, $R_2$, $R_3$ are operated in series, by contrast, the second switching means 50 of the second circuit arrangement Z is driven in such a way that it is closed, while the first switching means 41, 42, 43 of the second circuit arrangement Z are open.

The changeover between the second starting operating state and the continuous operating state is thus effected by means of the circuit arrangement Z. By contrast, the changeover between the first starting operating state and the second starting operating state is effected by means of the first circuit arrangement E.

The first circuit arrangement E has a first terminal 1 and preferably a second terminal 2, via which the first voltage source MV is connected to the first circuit arrangement. In this case, the second terminal 2 has a lower potential than the first terminal 1, and the second terminal 2 is connected to a first reference potential via an eleventh terminal 11 of the first circuit arrangement E.

The first circuit arrangement E furthermore has a third terminal 3, a fourth terminal 4, a fifth terminal 5 and a sixth terminal 6. These terminals are connected to the output-side terminals 85, 86, 87, 88 of the second circuit arrangement Z. In this case, the third terminal 3 of the first circuit arrangement E is connected to the output-side terminal 85 of the second circuit arrangement Z, the fourth terminal 4 is connected to the output-side terminal 86, the fifth terminal 5 is connected to the output-side terminal 87 and the sixth terminal 6 is connected to the output-side terminal 89.

Within the first circuit arrangement E, the abovementioned terminals are connected to further terminals, namely a seventh terminal 7, eighth terminal 8, a ninth terminal 9 and a tenth terminal 10. In this case, the seventh terminal 7 is connected to the second terminal 2, the eighth terminal 8 is connected to the fourth terminal 4, the ninth terminal 9 is connected to the fifth terminal 5 and the tenth terminal 10 is connected to the sixth terminal 6 of the first circuit arrangement E. In this case, the connection between the eighth terminal 8 and the fourth terminal 4 is switched, while the remaining terminals 3, 7; 5, 9; 6, 10 are directly connected to one another.

In the case of an embodiment that is not illustrated, the seventh terminal 7, the ninth terminal 9 and the tenth terminal 10 may be omitted.

The first terminal 1 of the first circuit arrangement E is connected to the eighth terminal 8 via a first switching means 10 of the first circuit arrangement E. The eighth terminal 8 is connected to the fourth terminal 4 via a second switching means 20 of the second circuit arrangement Z. Therefore, the connection between the eighth terminal 8 and the fourth terminal 4 is switched, as already mentioned previously.

In addition to the first switching means 10 and the second switching means 20, the first circuit arrangement E has third switching means 31 to 34. The latter connect the third terminal 3, the fourth terminal 4, the fifth terminal 5 and the sixth terminal 6, in the closed state, to the first reference potential present at the eleventh terminal. Moreover, the third switching means 31 to 34 connect the terminals 3 to 6 to the second terminal 2, to which the first voltage source MV is connected.

Via the first switching means 10, the second switching means 20 and the third switching means 31 to 34, it is possible to change between a first state and a second state of the first circuit arrangement E. The change between said first state and the second state of the circuit arrangement E corresponds to a change from the first starting operating state to the second operating state of the entire arrangement illustrated in FIG. 1.

In the first starting operating state of the arrangement according to the invention, as illustrated in FIG. 1, the first switching means 10 and the third switching means 31 to 34 are closed. By contrast, the second switching means 20 is open.

The loads $R_1$, $R_2$, $R_3$ are connected to the first circuit arrangement E according to the invention, the load $R_3$ is present at the seventh and eighth terminals 7, 8, the load $R_2$ is present at the eighth and ninth terminals 8, 9 and the load $R_1$ is present at the ninth and tenth terminals 9, 10. The loads $R_1$, $R_2$, $R_3$ are thus connected in series between the seventh terminal 7 and the tenth terminal 10.

In the case of alternative embodiments (not illustrated) already mentioned, the loads $R_1$, $R_2$, $R_3$ may be directly connected to the corresponding output-side terminals 85, 87 and the second reference potential instead of the seventh terminal 7, ninth terminal 9 and tenth terminal 10, respectively, which are absent in these alternative embodiments. In the continuous operating state, no current for supplying the loads then flows through the first circuit arrangement.

In the first starting operating state, in the case of the arrangement illustrated (and also in the case of the arrangement that is not illustrated), the two right-hand loads $R_2$, $R_3$ are supplied with electrical energy from the first voltage source MV. In this first starting operating state, via the first terminal 1, an electric current flows via the closed first switching means 10 to the terminal 8. From the terminal 8, the current then flows further via the load $R_3$ to the seventh terminal 7 and via the load $R_2$ to the ninth terminal 9. From the seventh terminal 7 and from the ninth terminal 9, the current then flows via the closed third switching means 31 and 33, respectively, to the second terminal 2 and back into the first voltage source MV. Consequently, only the loads $R_3$, $R_2$ are supplied with electrical energy in the first starting operating state. The two loads are heated as a result. The heat radiated in this case is sufficient also to bring the load $R_1$ to an operating temperature. Therefore, during the first starting operating state, the load $R_1$ does not itself have to have a current flowing through it in order to obtain the operating temperature.

If the intention is then to change from the first starting operating state to the second starting operating state of the arrangement, the switching means 10, 20, 31 to 34 of the first circuit arrangement E change their position. That is to say that the first switching means 10 is opened, as are the third switching means 31 to 34. By contrast, the second switching means 20 is closed. In the second starting operating state and also in the continuous operating state, there is thus always a connection without branching junctions between the third terminal 3 and the seventh terminal 7, the fourth terminal 4 and the eighth terminal 8, the fifth terminal 5 and the ninth terminal 9 and the sixth terminal 6 and the tenth terminal 10. Since at a change-over from the second starting operating state to the continuous operating state is no longer changed the position of the switching means 10, 20, 31 to 34 in the first circuit arrangement, the changeover between the second starting operating state and the continuous operating state ensues exclusively by way of the switching means 41, 42, 43, 50 and 61, 62, 63, 64 of the second circuit arrangement Z.

In the second starting operating state of the arrangement, the loads $R_1$, $R_2$, $R_3$ are operated in parallel with one another. In this case, the third switching means 60 to 64 are driven in such a way that voltage is supplied to the loads $R_1$, $R_2$, $R_3$ via the third switching means 62, 63, 64 of the first group of the third switching means 61 to 64. In the second starting operating state of the arrangement, a current then flows via the first switching means 41 illustrated on the left in FIG. 1 and the coil 91 illustrated on the left, which current has a magnitude corresponding to triple the magnitude of one of the currents $I_{L1}$, $I_{L2}$, $I_{L3}$ that flows through the load $R_1$, $R_2$, $R_3$, the load currents $I_{L1}$, $I_{L2}$, $I_{L3}$ being identical in magnitude. The total current flowing through the coil 91 is divided up downstream of the coil.

A first portion, namely the load current $I_{L3}$, flows via the coil 93 illustrated on the right in FIG. 1, the switching means 43 illustrated on the right in the figure, the first output-side terminal 85 of the second circuit arrangement Z, the third terminal 3 of the first circuit arrangement E, the seventh terminal 7 of the first circuit arrangement E into the load $R_3$ connected to the seventh terminal 7. From the load $R_3$, the load current $I_{L3}$ then flows via the eighth terminal 8, the second switching means 20, the fourth terminal 4 of the first circuit arrangement E, the output-side terminal 86 of the second circuit arrangement 2 into the coil 92 illustrated in the center in FIG. 1, and via the first controllable switching means 42 to the terminal 89—which is at the second reference potential—of the second circuit arrangement Z and on into the second output-side terminal 105 on the secondary side of the transformer T.

A second portion of the current flowing through the coil 91 illustrated on the left in FIG. 1, namely the load current $I_{L2}$, flows via the second output-side terminal 87, the fifth terminal 5 of the first circuit arrangement E, the ninth terminal 9 of the first circuit arrangement E into the load $R_2$. From there, the load current $I_{L2}$ flows together with the load current $I_{L3}$ via the eighth terminal 8, the closed second switching means 20, the fourth terminal 4, the second output-side terminal 86, the coil 92, the closed first switching means of the second circuit arrangement Z to the terminal 89 of the second circuit arrangement Z.

A third and last portion of the total current flowing through the coil 91 illustrated on the left in FIG. 1 flows via the second output-side terminal 87 of the second circuit arrangement Z, the fifth terminal 5 of the first circuit arrangement E, the ninth terminal 9 of the first circuit arrangement E into the load $R_1$. What is involved in this case is the load current $I_{L1}$ flowing from the load $R_1$ via the tenth terminal 10 and the sixth terminal 6 of the first circuit arrangement E directly to the second output-side terminal 105 on the secondary side of the transformer T.

What is claimed is:

1. A first circuit arrangement (E) for supplying variable loads that can be connected to the first circuit arrangement (E)
    from a first current or voltage source (MV) in a first state of the first circuit arrangement
    comprising:
    the first circuit arrangement (E) has a first terminal and a second terminal for connection to the first current or voltage source (MV) and a third terminal, at least one fourth terminal and at least one fifth terminal for connection to a second current or voltage source (Z);
    the second terminal is at a reference potential;
    the first circuit arrangement (E) has at least one eighth terminal for connection to two loads ($R_2$; $R_3$);
    the first circuit arrangement (E) has controllable switching means for changing over between the first state and a second state;
    in the first state, the at least one eighth terminal (8 for connection to the two loads ($R_2$, $R_3$) is connected to the first terminal and the third terminal and the fifth terminal are connected to the reference potential, and
    in the second state, theat least one eighth terminal is connected to the fourth terminal.

2. The first circuit arrangement (E) as claimed in claim 1 from a second current or voltage source in particular of a second circuit arrangement (Z) in the second state of the first circuit arrangement (E),
    comprising the following features:
    the first circuit arrangement (E) has, in addition to the at least one eighth terminal, a seventh terminal and at least one ninth terminal for connection to the loads ($R_1$, $R_2$, $R_3$),
    in the first state and in the second state, the seventh terminal is directly connected to the third terminal.

3. The first circuit arrangement as claimed in claim 2, wherein, in the first state, the controllable switching means connects the seventh terminal and the ninth terminals to the reference potential.

4. The first circuit arrangement as claimed in claim 2, wherein the ninth terminal is connected to a fifth terminal in each case.

5. The first circuit arrangement as claimed in claim 1, wherein the controllable switching means, in the second state, connects the at least one eighth terminal to a fourth terminal in each case.

6. The first circuit arrangement as claimed in claim 1, wherein the first circuit arrangement (E) has a sixth terminal and a tenth terminal).

7. The first circuit arrangement as claimed in claim 6, wherein the sixth terminal and the tenth terminal are directly connected to one another.

8. The first circuit arrangement as claimed in claim 6, wherein the switching means, in the first state, connect the tenth terminal to the reference potential.

9. The first circuit arrangement as claimed in claim 1, wherein the loads ($R_1$, $R_2$, $R_3$) can be connected between the seventh terminal and the at least one eighth terminals between the at least one eighth terminals and the ninth terminal, and between at least one ninth terminal and, with interposition of the tenth terminal, the reference potential, in which case all the loads can then be connected in series between the seventh terminal and, with interposition of the tenth terminal, the reference potential.

10. An arrangement for supplying variable loads ($R_1$, $R_2$, $R_3$)
comprising a first circuit arrangement (E) as claimed in claim 1, to which the loads ($R_1$, $R_2$, $R_3$) can be connected; and
comprising a second circuit arrangement (Z) as second current or voltage source,
in which case the arrangement can be operated in at least three states, namely
a first starting operating state, in which the first circuit arrangement (E) is in the first state and the loads ($R_1$, $R_2$, $R_3$) can be supplied from the first current and voltage source (MV),
a second starting operating state, in which the first circuit arrangement (E) is in the second state and the loads ($R_1$, $R_2$, $R_3$) can be supplied from the second circuit arrangement (Z) in parallel with one another, and
a continuous operating state, in which the first circuit arrangement (E) is in the second state and the loads ($R_1$, $R_2$, $R_3$) can be supplied from the second circuit arrangement (Z) in a manner connected in series,
it being possible to effect changeover between the first starting operating state and the second starting operating state through the switching means of the first circuit arrangement and between the second starting operating state and the continuous operating state through switching means of the second circuit arrangement (Z).

11. The arrangement as claimed in claim 10, wherein the second circuit arrangement (Z) has means for ensuring a supply of the loads ($R_1$, $R_2$, $R_3$) with electrical energy of identical magnitude in the second starting operating state of the circuit arrangement.

12. The arrangement as claimed in claim 10, wherein the second circuit arrangement (Z) has output-side terminals by means of which the second circuit arrangement is connected to the third, fourth and fifth terminals of the first circuit arrangement (E).

13. The arrangement as claimed in claim 10, wherein, in the continuous operating state, a first voltage is dropped between the output-side terminal and connected thereto the third terminal and seventh terminal of the first circuit arrangement, on the one hand, and the reference potential, while the remaining output-side terminals of the second circuit arrangement and connected thereto the fourth and eighth terminals and, respectively fifth and ninth terminals are potential-free in no-load operation of the arrangement.

14. The arrangement as claimed in claim 12, wherein, in the second starting operating state, in no-load operation, a first voltage is dropped between the first output-side terminal of the second circuit arrangement (Z) and a first half of the second output-side terminals of the second circuit arrangement, on the one hand, and a second reference point, on the other hand, while a second half of the second output-side terminals of the second circuit arrangement (Z) has the same potential as the second reference point.

15. The arrangement as claimed in claim 10, wherein the second circuit arrangement comprises a last output-side terminal which is at the second reference potential.

16. The arrangement as claimed in claim 11, wherein the ensuring means comprise coils.

* * * * *